US011357170B1

(12) United States Patent
Funk et al.

(10) Patent No.: US 11,357,170 B1
(45) Date of Patent: Jun. 14, 2022

(54) STEERING LEVER PIVOT ASSEMBLY FOR TERRAIN WORKING VEHICLE

(71) Applicant: Excel Industries, Inc., Hesston, KS (US)

(72) Inventors: Brian R. Funk, Goessel, KS (US); James A. Wright, Hesston, KS (US); Tyler A. Yost, Hesston, KS (US)

(73) Assignee: EXCEL INDUSTRIES, INC., Hesston, KS (US)

(*) Notice: Subject to any disclaimer, the term of this patent is extended or adjusted under 35 U.S.C. 154(b) by 965 days.

(21) Appl. No.: 16/112,340

(22) Filed: Aug. 24, 2018

(51) Int. Cl.
| *A01D 34/82* | (2006.01) |
| *B62D 11/00* | (2006.01) |
| *B62D 1/12* | (2006.01) |
| *B62D 11/02* | (2006.01) |
| *A01D 101/00* | (2006.01) |

(52) U.S. Cl.
CPC ............ *A01D 34/824* (2013.01); *B62D 1/12* (2013.01); *B62D 11/006* (2013.01); *B62D 11/02* (2013.01); *A01D 2101/00* (2013.01); *B60Y 2200/223* (2013.01)

(58) Field of Classification Search
CPC .... A01D 34/824; A01D 2101/00; B62D 1/12; B62D 11/006; B62D 11/02; B60Y 2200/223
See application file for complete search history.

(56) References Cited

U.S. PATENT DOCUMENTS

| 5,644,903 | A | * | 7/1997 | Davis, Jr. | ............ | B62D 11/183 |
| | | | | | | 180/19.3 |
| 6,301,864 | B1 | * | 10/2001 | Damie | ............... | A01D 34/6812 |
| | | | | | | 56/11.3 |
| 7,458,432 | B2 | * | 12/2008 | Mayer | ................... | A01D 34/66 |
| | | | | | | 180/6.32 |
| 7,686,108 | B2 | * | 3/2010 | Piontek | ................. | A01D 69/10 |
| | | | | | | 180/6.48 |
| 8,522,901 | B1 | * | 9/2013 | VanLue | ................ | F16H 61/427 |
| | | | | | | 180/6.32 |
| 9,021,914 | B1 | * | 5/2015 | Newcomb | ............. | F16H 63/067 |
| | | | | | | 74/481 |
| 9,313,953 | B2 | * | 4/2016 | Borshov | ................ | B60T 1/005 |
| 9,510,503 | B2 | * | 12/2016 | Elhardt | ............... | A01D 34/001 |
| 2006/0123756 | A1 | * | 6/2006 | Eavenson | ........... | A01D 34/828 |
| | | | | | | 56/10.2 R |

(Continued)

*Primary Examiner* — Kevin Hurley
*Assistant Examiner* — Conan D Duda
(74) *Attorney, Agent, or Firm* — Shook, Hardy & Bacon, L.L.P.

(57) ABSTRACT

A steering lever pivot assembly may have a two-axis polymer housing pivotally coupled to a terrain working vehicle at opposing bosses and comprising a pair of reciprocal housing portions, a steering lever pivotally coupled to the two-axis polymer housing, the steering lever having a connecting portion for coupling to a first system of the terrain working vehicle, a clasp coupled to the steering lever and the two-axis polymer housing and having a mounting portion for coupling to a first system of the terrain working vehicle, and a pair of bushings that receive one of the opposing bosses therein. In some aspects, the two-axis polymer housing provides a first axis of rotation at the pivotal coupling between the steering lever and the two-axis polymer housing and a second axis of rotation through the opposing bushings, which may be axially aligned.

16 Claims, 12 Drawing Sheets

(56) References Cited

U.S. PATENT DOCUMENTS

| | | | |
|---|---|---|---|
| 2006/0174601 A1* | 8/2006 | Piontek | A01D 34/64 56/11.3 |
| 2007/0068711 A1* | 3/2007 | Adkins | B62D 11/006 180/6.48 |
| 2008/0307918 A1* | 12/2008 | Hoffman | A01D 34/68 74/484 R |
| 2009/0044506 A1* | 2/2009 | Nunez | A01D 34/64 56/11.3 |
| 2009/0056492 A1* | 3/2009 | Trefz | A01D 34/69 74/484 R |
| 2009/0217636 A1* | 9/2009 | Loxterkamp | A01D 34/64 56/10.8 |
| 2012/0061153 A1* | 3/2012 | Porter | B62D 7/00 180/6.48 |
| 2014/0338300 A1* | 11/2014 | Porter | B62D 11/006 56/14.7 |
| 2017/0086376 A1* | 3/2017 | Burns | A01D 34/64 |
| 2018/0292001 A1* | 10/2018 | Aoki | A01D 34/66 |
| 2019/0183044 A1* | 6/2019 | Lapp | A01D 34/824 |
| 2019/0202289 A1* | 7/2019 | Namiki | G05G 9/047 |
| 2019/0274251 A1* | 9/2019 | Dunbar | A01D 69/10 |
| 2020/0000039 A1* | 1/2020 | Reese | A01D 69/10 |
| 2020/0146214 A1* | 5/2020 | Wagner | A01D 34/6812 |
| 2020/0269917 A1* | 8/2020 | Welz | B62D 11/006 |
| 2020/0390031 A1* | 12/2020 | Yang | A01D 34/64 |
| 2021/0237790 A1* | 8/2021 | Bartel | A01D 34/64 |

* cited by examiner

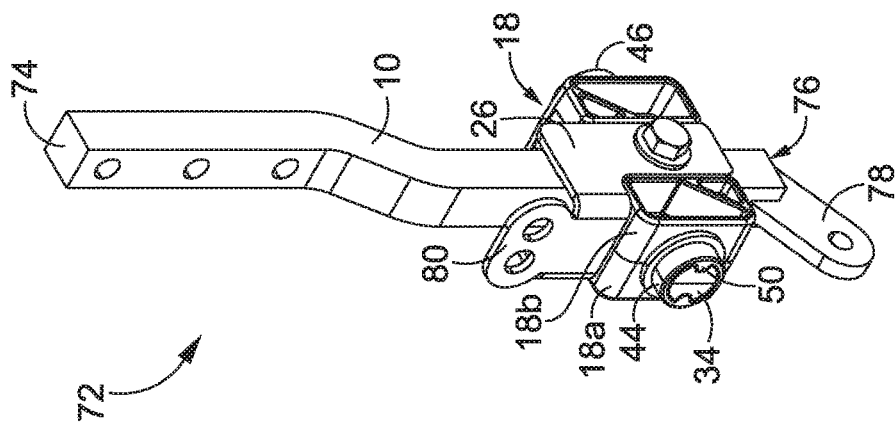
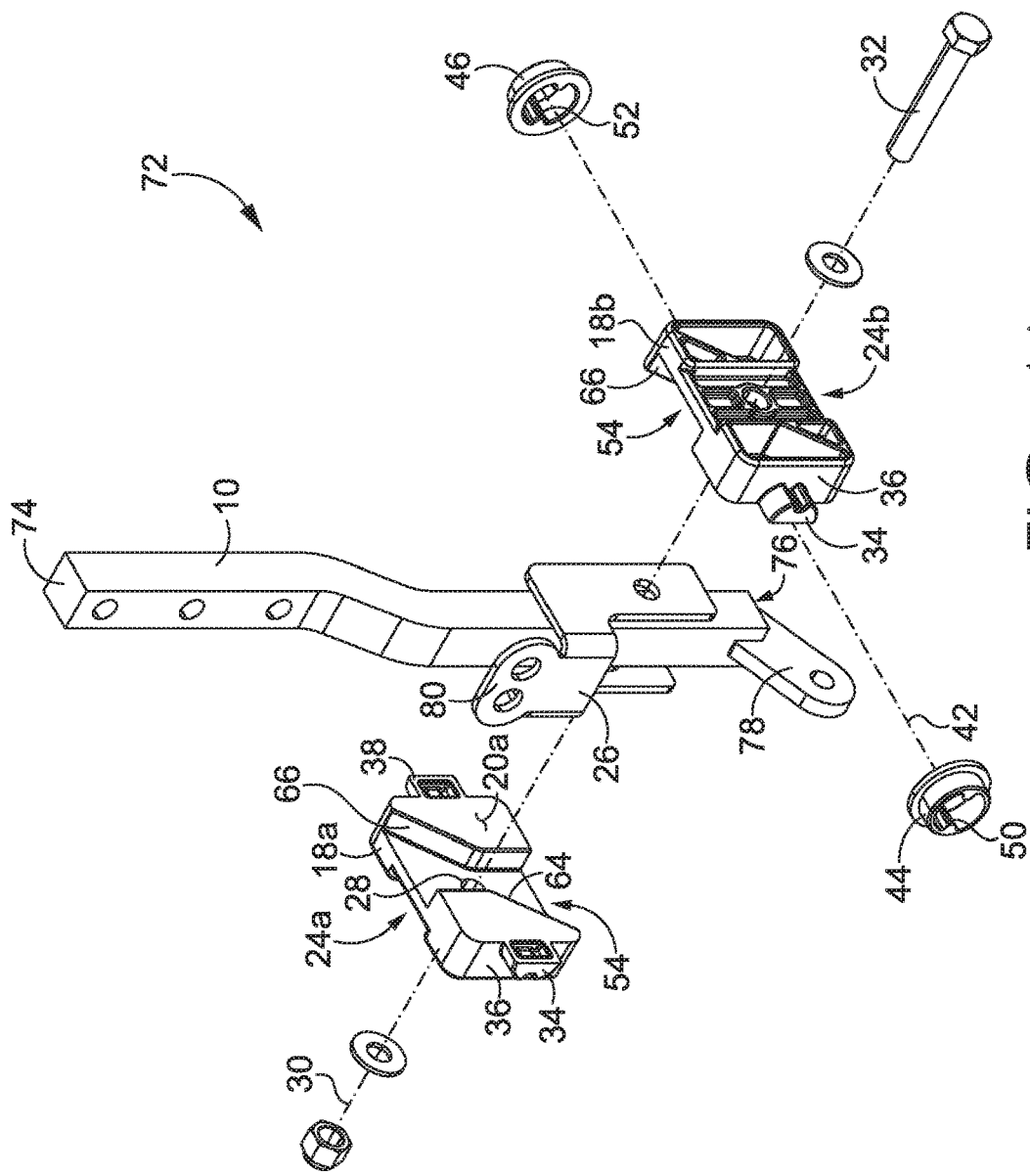
FIG. 4B
FIG. 4A

STEERING LEVER PIVOT ASSEMBLY FOR TERRAIN WORKING VEHICLE

FIELD

Aspects provided relate to control of terrain working vehicles. More particularly, aspects herein relate to steering lever pivot assemblies for controlling terrain working vehicles.

BACKGROUND

A terrain working vehicle may include a propulsion system to drive the vehicle and one or more steering levers to control the propulsion system. Steering levers are typically pivotally coupled to the vehicle such that they may pivot forward and rearward, relative to the vehicle, to control forward and rearward propulsion of the vehicle. In some aspects, steering levers may also pivot laterally, relative to the vehicle, to engage a parking brake. Thus, steering levers may need to be pivotally coupled to the vehicle such that they pivot along two axes.

Previously, two-axis pivoting has been accomplished by pivotally coupling the steering lever to a plate and the plate in turn fixedly coupled to a pivot cylinder. Thus, the first axis of rotation would be about the pivotal connection to the plate and cause the steering lever to rotate within a plane parallel to the plate (e.g., in a lateral direction). The second axis of rotation would be about the pivot cylinder, which would be pivotally coupled to the frame of the terrain working vehicle, and cause both the steering lever and the plate to rotate within a plane normal to the axis of the pivot cylinder (e.g., in a forward and rearward direction).

The plate and pivot cylinder were previously made from a metal or metal alloy, which are generally expensive materials to obtain. Using metal allowed the plate to be welded to the pivot cylinder to form a unitary, two-axis pivot mechanism through which the propulsion system was controlled. The unitary, two-axis pivot mechanism, however, required additional manufacturing steps beyond welding. For example, the unitary, two-axis pivot mechanism required a secondary finishing process (e.g., plating) to prevent corrosion and other wear of the metal or metal alloy.

SUMMARY

Aspects hereof relate to two-axis pivot assemblies comprised of a polymer for controlling features or functions of apparatuses and devices with one or more steering levers. At a high level, a two-axis pivot assembly may comprise a polymer housing having a boss extending from each side of the polymer housing in opposing directions. A steering lever coupled to the polymer housing may rotate around a first axis of rotation associated with the two bosses. Further, the steering lever may be pivotally coupled to the polymer housing such that the steering lever may rotate relative to the polymer housing. For example, the polymer housing may include a slot through which the steering lever may be inserted and a pin may extend through the polymer housing and the steering lever. The slot may be sized to allow the steering lever to rotate within the slot. Thus, in aspects, the steering lever may rotate around a second axis of rotation associated with the pin.

Forming a two-axis pivot assembly in this manner has a number of advantages. For example, the polymer housing may be injection molded from any suitable polymer, which provides a significant savings. First, the cost of the polymer for the housing is significantly less than the cost of metal or metal allow for the previous plate and pivot cylinder. Second, the cost of forming the polymer housing to its finished condition is also significantly less than the cost of forming the previous plate and pivot cylinder (e.g., no welding involved, less involved manufacturing from the raw material). Third, the polymer housing does not require a secondary finishing process (e.g., plating), which saves both time and money. Fourth, assembling the polymer housing is easier, therefore more efficient, than assembling the previous plate and pivot cylinder. These are only some of the many advantages of the claimed subject matter over previous attempts to produce a two-axis pivot assembly for a steering lever.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4A depicts an exploded perspective view of a two-axis pivot assembly, in accordance with aspects hereof;

FIG. 4B depicts a perspective view of the two-axis pivot assembly of FIG. 4A in an assembled state, in accordance with aspects hereof;

DETAILED DESCRIPTION

Figure 1:
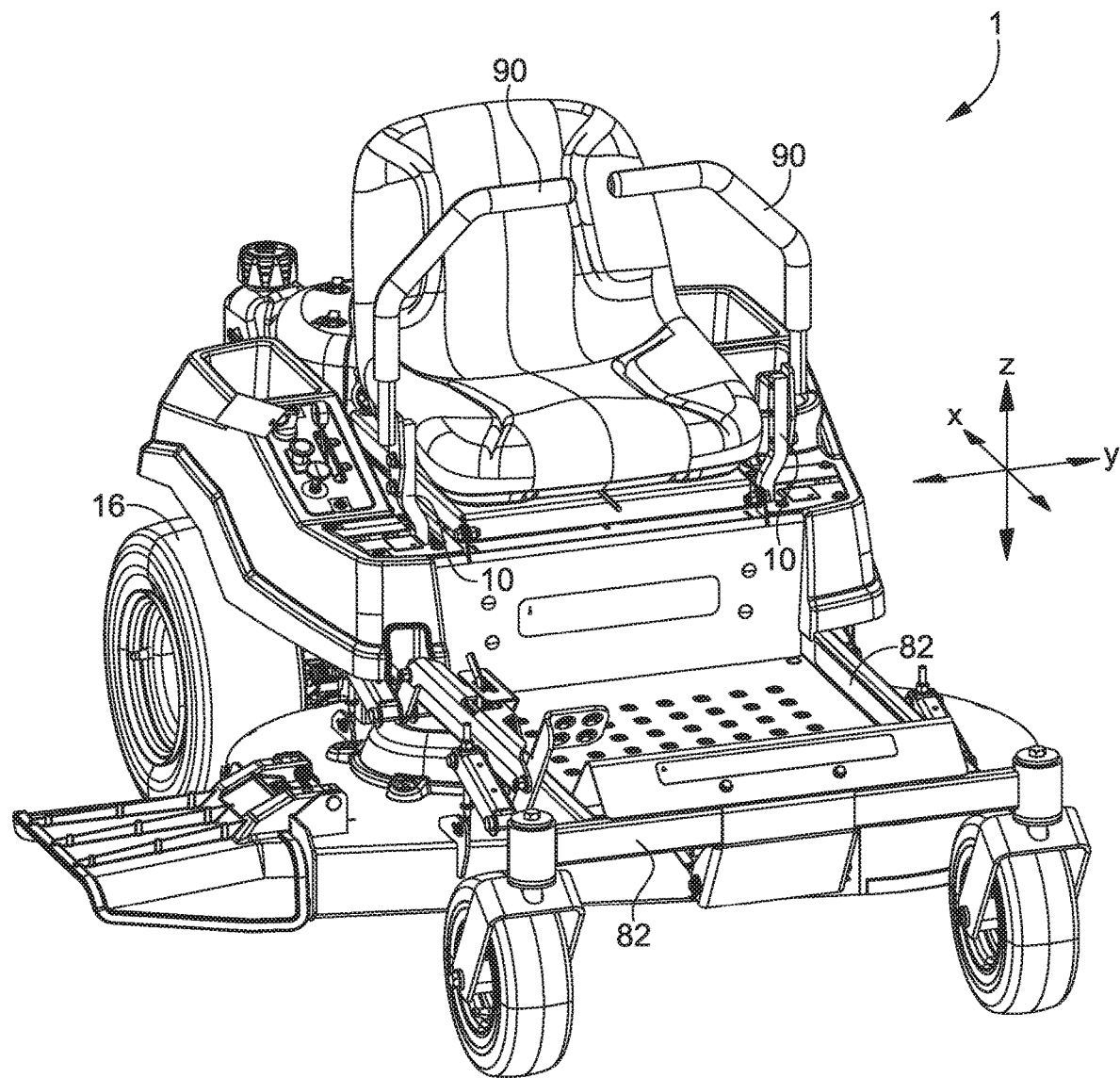
FIG. 1 depicts a perspective view of a terrain working vehicle having steering levers, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other present or future technologies. Further, it should be appreciated that the figures do not necessarily represent an all-inclusive representation of the embodiments herein and may have various components hidden to aid in the written description thereof.

Aspects hereof may be described using directional terminology. For example, the Cartesian coordinate system may be used to describe positions and movement or rotation of the features described herein. Accordingly, some aspects may be described with reference to three mutually perpendicular axes. The axes may be referred to herein as lateral, longitudinal, and vertical, and may be indicated by reference characters X, Y, and Z, respectively, in the accompanying figures. For example, the terms "vertical" and "vertically" as used herein refer to a direction perpendicular to each of the lateral and longitudinal axes. Additionally, relative location terminology will be utilized herein. For example, the term "proximate" is intended to mean on, about, near, by, next to, at, and the like. Therefore, when a feature is proximate another feature, it is close in proximity but not necessarily exactly at the described location, in some aspects. Additionally, the term "distal" refers to a portion of a feature herein that is positioned away from a midpoint of the feature.

At a high level, aspects hereof relate to a two-axis pivot assembly comprised of a polymer for controlling features or functions of apparatuses and devices with a steering lever. A two-axis pivot assembly may comprise a polymer housing having a boss extending from each side of the polymer housing in opposing directions. A steering lever coupled to the polymer housing may rotate around a first axis of rotation associated with the two bosses. Further, the steering lever may be pivotally coupled to the polymer housing such that the steering lever may rotate relative to the polymer housing. For example, the polymer housing may include a slot through which the steering lever may be inserted and a pin may extend through the polymer housing and the steering lever. The slot may be sized to allow the steering lever to rotate within the slot. Thus, in aspects, the steering lever may rotate around a second axis of rotation associated with the pin.

The two-axis pivot assembly may be used in conjunction with a steering lever to control many types of terrain working vehicles. For example, it may be used on a mower or a utility loader, among other apparatuses and devices. Further, the steering lever may be used to control many different systems of the terrain working vehicle. For example, the steering lever may be used to control a propulsion system, a brake system, or a steering system, among other systems. Moreover, the two-axis pivot assembly may allow control of at least two systems. For example, a first system may be controlled by rotation of the steering lever along a first axis and a second system may be controlled by rotation of the steering lever along a second axis.

As used herein, the term "steering lever" refers to a control device that pivots between a plurality of positions to control any one of the systems described above or any other system controllable by such pivoting as will be recognized by one having skill in the art. Further, such term is not limited to a control device that controls a propulsion system or a steering system of the terrain working vehicle.

For the sake of brevity, the following description will describe the invention in terms of a particular embodiment, a mower. But, as discussed above, the present invention may be used with many different types of terrain working vehicles.

Turning now to the figures generally, and in particular to FIG. 1, the illustrated terrain working vehicle is depicted as a mower 1. The mower 1 is shown as a zero-turn, riding mower having a side-discharge cutting deck, however, the present invention is useful in other mower configurations (e.g., a stand-on mower, a bagging mower, a non-zero turn mower, etc.). As the illustrated mower 1 is a zero-turn mower, there are two steering levers 10, each of which is coupled to a two-axis pivot assembly 12 (best seen in FIG. 7). Each steering lever 10 of the mower 1 controls an independent propulsion system 14 that drives one of the drive wheels 16. Further, each steering lever 10 of the mower 1 also controls a parking brake associated with the independent propulsion system 14. For the sake of brevity, only one two-axis pivot assembly 12 will be discussed below, except as explicitly stated otherwise. However, the following discussion applies equally to the other two-axis pivot assembly 12.

For ease of reference when describing the mower 1, and portions thereof, three orthogonal axes are illustrated in FIG. 1. In particular, an X-axis, a Y-axis, and a Z-axis are shown. The X-axis is associated with a longitudinal (e.g., front-to-back) direction of the mower 1. The Y-axis is associated with a lateral (e.g., side-to-side) direction of the mower 1. The Z-axis is associated with a vertical (e.g., bottom-to-top) direction of the mower 1.

Figure 2:
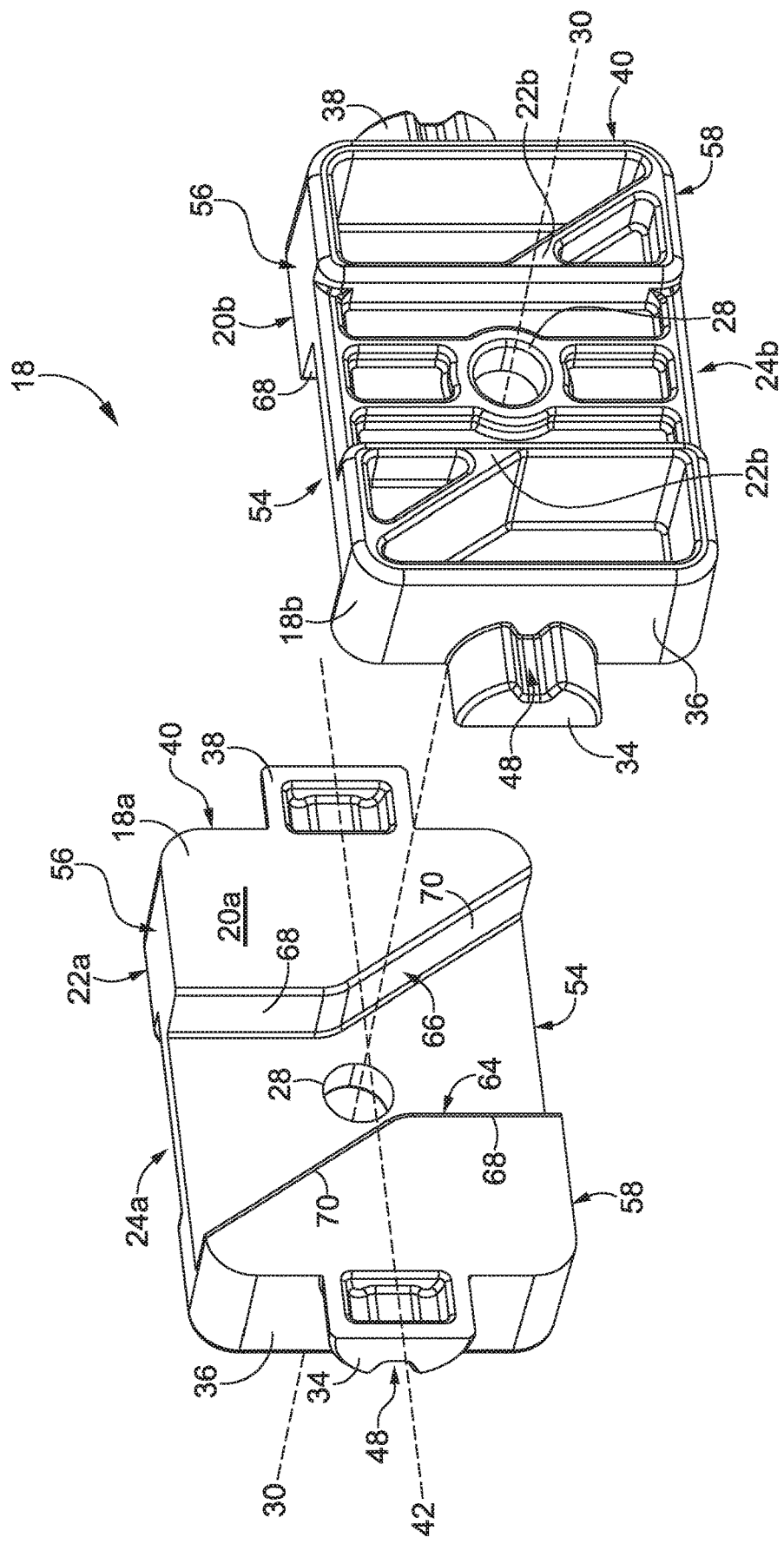
FIG. 2 depicts a perspective view of two housing halves that mate to form a polymer housing, in accordance with aspects hereof.

Turning now to FIG. 2, a polymer housing 18 is illustrated. The polymer housing 18 comprises a first housing portion 18a and a second housing portion 18b. In the illustrated aspect, the first housing portion 18a comprises a first half of the polymer housing 18 and the second housing portion 18b comprises a second half of the polymer housing 18. Further, in the illustrated aspect, the first housing portion 18a is a mirror image of the second housing portion 18b. In other aspects, however, the polymer housing 18 may comprise a single, unitary portion. In still other aspects, the polymer housing 18 may be divided into more than two portions. In yet other aspects, the polymer housing 18 may be split between two portions of unequal sizes or of unequal or non-mirror image proportion.

The polymer housing 18 is illustrated as having a substantially rectangular shape. In other aspects, however, the polymer housing 18 may comprise a different shape. Indeed, an advantage of forming the polymer housing 18 from a polymer is the ability to form the polymer housing 18 into a plurality of regular and irregular shapes. For example, if the polymer housing 18 is manufactured by injection molding, then any shape that may be defined by a mold may be used in accordance with some aspects.

Each of the first housing portion 18a and the second housing portion 18b include an interior surface 20a and 20b, respectively. Each of the first housing portion 18a and the second housing portion 18b also include an exterior surface 22a and 22b, respectively. In order to save on material costs, the illustrated exterior surfaces 22a and 22b have several cavities formed therein. The cavities are open to the exterior surfaces 22a and 22b and are enclosed on all other sides by a plurality of walls. The ends of the plurality of walls define the exterior surfaces 22a and 22b. In other aspects, the first housing portion 18a and the second housing portion 18b may each be formed from solid polymer blocks. A recessed portion 24a and 24b is set into the exterior surfaces 22a and 22b, respectively, of the illustrated aspect for retaining a clasp 26 as discussed below.

An aperture 28 is formed through the polymer housing 18 in a first direction along a first axis 30. The aperture 28 is configured to allow a steering lever 10 to be pivotally coupled to the polymer housing 18. For example, a pin 32 (shown in FIG. 4A) may pass through the aperture 28 in the first housing portion 18a, through an opening in the steering lever 10, and through the aperture 28 in the second housing portion 18b to pivotally couple the steering lever 10 to the polymer housing 18. In other aspects, different types of pivotal couplings between the steering lever 10 and the polymer housing 18 may be used so long as the steering lever 10 pivots around the first axis 30 relative to the polymer housing 18.

A first boss 34 projects out from a first side surface 36 of the polymer housing 18 and a second boss 38 projects out from a second side surface 40 of the polymer housing 18. Each of the first boss 34 and the second boss 38 extend in a second direction along a second axis 42 and thus are axially aligned. In other aspects, the first boss 34 and the second boss 38 may be linearly aligned, but not axially aligned. In still other aspects, the first boss 34 and the second boss 38 are neither linearly aligned nor axially aligned. In the illustrated aspect, the first boss 34 is split between the first housing portion 18a and the second housing portion 18b. In other aspects, the first boss 34 may project entirely from the first housing portion 18a or the second housing portion 18b. In still other aspects, the first boss 34 may project in uneven parts from the first housing portion 18a or the second housing portion 18b. Likewise, the second boss 38 may project from all, or part, of the first housing portion 18a or the second housing portion 18b.

Each of the first boss 34 and the second boss 38 may be configured to be received within a first bushing 44 (shown in FIGS. 4A and 4B) and a second bushing 46 (shown in FIGS. 4A and 4B), respectively. For example, a key slot 48 may be formed within the first boss 34 for receiving a key 50 formed on the first bushing 44. Likewise, a key slot may be formed within the second boss 38 for receiving a second key 52 on the second bushing 46.

A slot 54 is formed through the polymer housing 18. The slot 54 extends from a top surface 56 of the polymer housing 18 to a bottom surface 58 of the polymer housing 18. A portion of the slot 54 is recessed below each of the interior surfaces 20a and 20b resulting in a channel being formed in each of the interior surfaces 20a and 20b.

Figure 3:
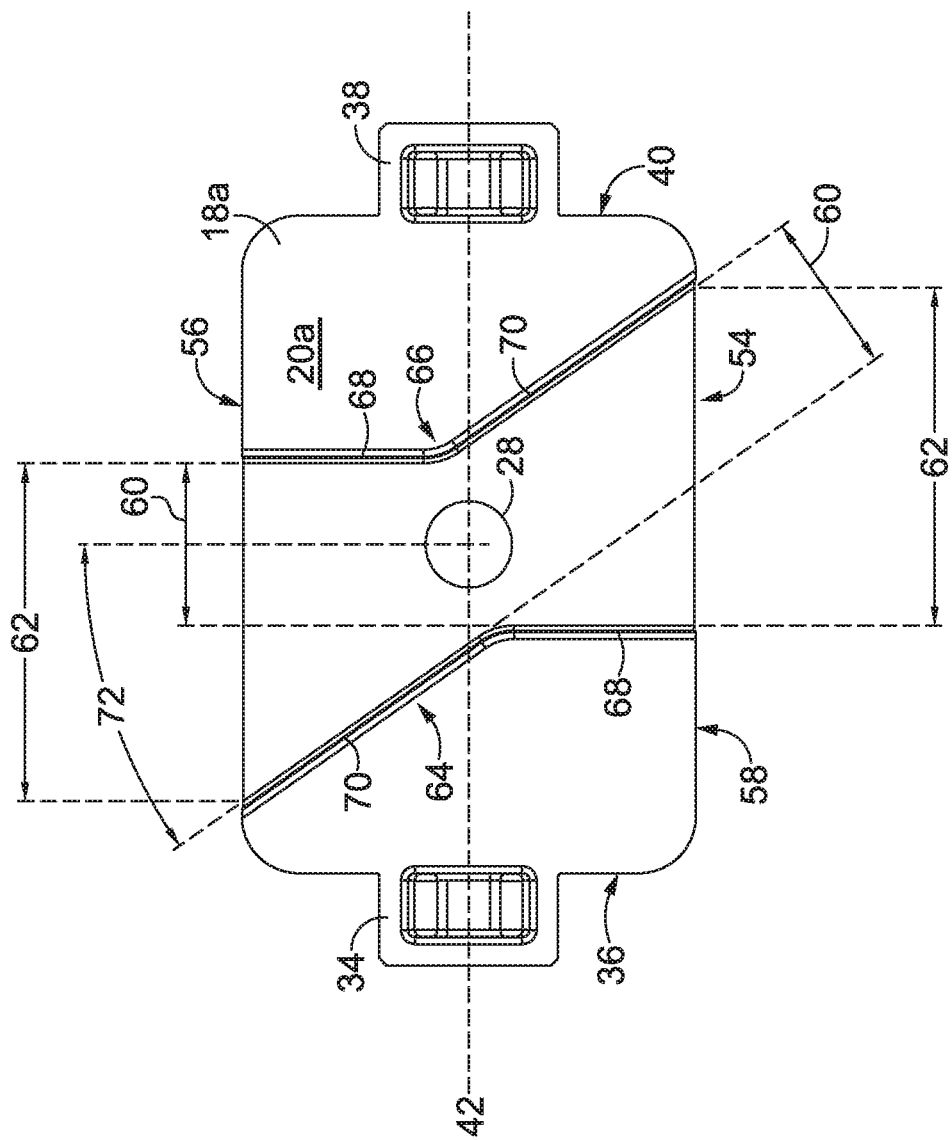
FIG. 3 depicts a front elevation view of an interior face of a housing half, in accordance with aspects hereof.

Referring to FIG. 3, the slot 54 has a minimum width 60 in the second direction sized to permit communication of the steering lever 10 through the slot 54. Similarly, the slot 54 has a longitudinal depth in the first direction sized to permit communication of the steering lever through the slot 54. In some aspects, the longitudinal depth of the slot 54 may vary. The slot 54 has a maximum width 62 proximate the opening formed in the top surface 56 and proximate the opening formed in the bottom surface 58. Thus, the slot 54 tapers from the maximum width 62 proximate the top surface 56, to a minimum width 60 proximate the second axis 42, and back to the maximum width 62 proximate the bottom surface 58. However, the maximum widths 62 at the top surface 56 and the bottom surface 58 may vary from each other, in accordance with some aspects.

The channel recessed into each of the first housing portion 18a and the second housing portion 18b includes a first channel wall 64 opposite a second channel wall 66. Each of the first channel wall 64 and the second channel wall 66 include a vertical portion 68 and an angular portion 70. The angular portion 70 is set at an angle 72 to the vertical portion 68. The angle 72 is forty-five degrees in the illustrated aspect. In other aspects, the angle 72 may be a different angle. For example, the angle 72 may be any angle within the range of 30-60 degrees, in accordance with some aspects. The first channel wall 64 and the second channel wall 66 may be used to limit the rotation of the steering lever 10 around the first axis 30, as discussed further below with reference to FIGS. 6 and 7.

The angular portion 70 of the first channel wall 64 is offset from the angular portion 70 of the second channel wall 66 a distance equal to the minimum width 60, in the illustrated aspect. The angular portion 70 of the first channel wall 64 is parallel to the angular portion 70 of the second channel wall 66. Likewise, the vertical portion 68 of the first channel wall 64 is parallel to the vertical portion 68 of the second channel wall 66. In other aspects, the slot 54 may be larger and/or may permit a greater range of motion to the steering lever 10 about the first axis 30. In yet other aspects, the vertical portions 68 of the first and second channel walls 64 and 66 may not be normal to the top surface 56 or the bottom surface 58 of the polymer housing 18. Thus, both portions of the first and second channel walls 64 and 66 may be set at an angle to the top surface 56 and/or the bottom surface 58. The complimentary width and parallel surfaces allow for alignment and support of the steering lever 10 at different pivoted positions.

Turning to FIGS. 4A and 4B, a pivot assembly 72 is illustrated in an exploded view (FIG. 4A) and in an assembled view (FIG. 4B). The illustrated pivot assembly 72 includes the polymer housing 18, the steering lever 10, the clasp 26, the first bushing 44, the second bushing 46, and the pin 32. The steering lever 10 is placed between the first housing portion 18a and the second housing portion 18b within the slot 54. The clasp 26 straddles the polymer housing 18 and has two downwardly extending flange portions. The two flange portions extend downwardly from the clasp 26 and are seated within the recessed portions 24a and 24b of the exterior surfaces 22a and 22b. An opening is formed in each of the two flange portions of the clasp 26. When assembled, the pin 32 extends through the steering lever 10, the polymer housing 18, and the two flange portions. The clasp 26 also includes an upwardly extending mounting portion 80.

In some aspects, the pivot assembly 72 may not include the first bushing 44 and/or the second bushing 46. In those aspects, the first boss 34 and the second boss 38 may be pivotally coupled directly to the mower 1 (e.g., at a frame). In the illustrated aspect, the first bushing 44 is coupled to the first boss 34 and the second bushing 46 is coupled to the second boss 38. The first bushing 44 and the second bushing 46 help couple the first housing portion 18a to the second housing portion 18b. The first bushing 44 and the second bushing 46 are also advantageous because they become wear parts on the mower 1. That is, rather than the first boss 34 and the second boss 38 wearing from repeated rotation at the pivotal coupling to the mower 1, the first bushing 44 and the second bushing 46 turn at said coupling. This results in the first bushing 44 and the second bushing 46 being primary parts to wear, which are less expensive parts to replace. It is even more advantageous for the first bushing 44 and the second bushing 46 to comprise a polymer, which is more cost effective and may be more wear resistant and corrosion resistant than a metal or metal alloy. In other aspects, however, the pivot assembly 72 need not include the first bushing 44 and/or the second bushing 46.

The steering lever 10 includes a top end 74 opposite a bottom end 76. The steering lever 10 is pivotally coupled to the polymer housing 18 at an intermediate point between the top end 74 and the bottom end 76. In other aspects, however, the steering lever 10 may be pivotally coupled to the polymer housing 18 at any point. The steering lever 10 also includes a connecting flange 78 for coupling to the parking brake system of the mower 1. For example, a linkage may mechanically couple the connecting flange 78 to the parking brake system such that rotation of the steering lever 10 engages or disengages the parking brake. In other aspects, the connecting flange 78 may be coupled to any other system of the mower 1. In still other aspects, the steering lever 10 may be coupled to the parking brake system, or any other system, by non-mechanical couplings. For example, pivoting the steering lever 10 may electrically control the parking brake system (e.g., through a control-by-wire system).

The clasp 26 is coupled to the steering lever 10 for coupling to a propulsion system of the mower 1. For example, a linkage may mechanically couple the mounting portion 80 of the clasp 26 to the propulsion system such that rotation of the steering lever 10 initiates forward or rearward propulsion. In other aspects, the mounting portion 80 may be integrally formed within the steering lever 10 (e.g., the connecting flange 78). Conversely, the clasp 26 may include a second mounting portion that replaces or augments the connecting flange 78. In still other aspects, a plurality of clasps 26 may be coupled to the steering lever 10 and/or the polymer housing 18.

In the illustrated aspect, the mounting portion 80 of the clasp 26 is laterally offset from the propulsion system. Thus, the linkage connecting the mounting portion 80 to the propulsion system travels in both the longitudinal (front-to-back) direction of the mower 1 and the lateral (side-to-side) direction of the mower 1. This results in a torque being applied to the clasp 26, which could result in at least a portion of the clasp 26 twisting when the steering lever 10 is pivoted. Seating the two downwardly flange portions of the clasp 26 within the recesses 24a and 24b on the exterior surfaces 22a and 22b prevents the clasp 26 from twisting. That is, the lip created on either side of the two downwardly flange portions of the clasp 26 hold the edges of the flange portions.

Figure 5:
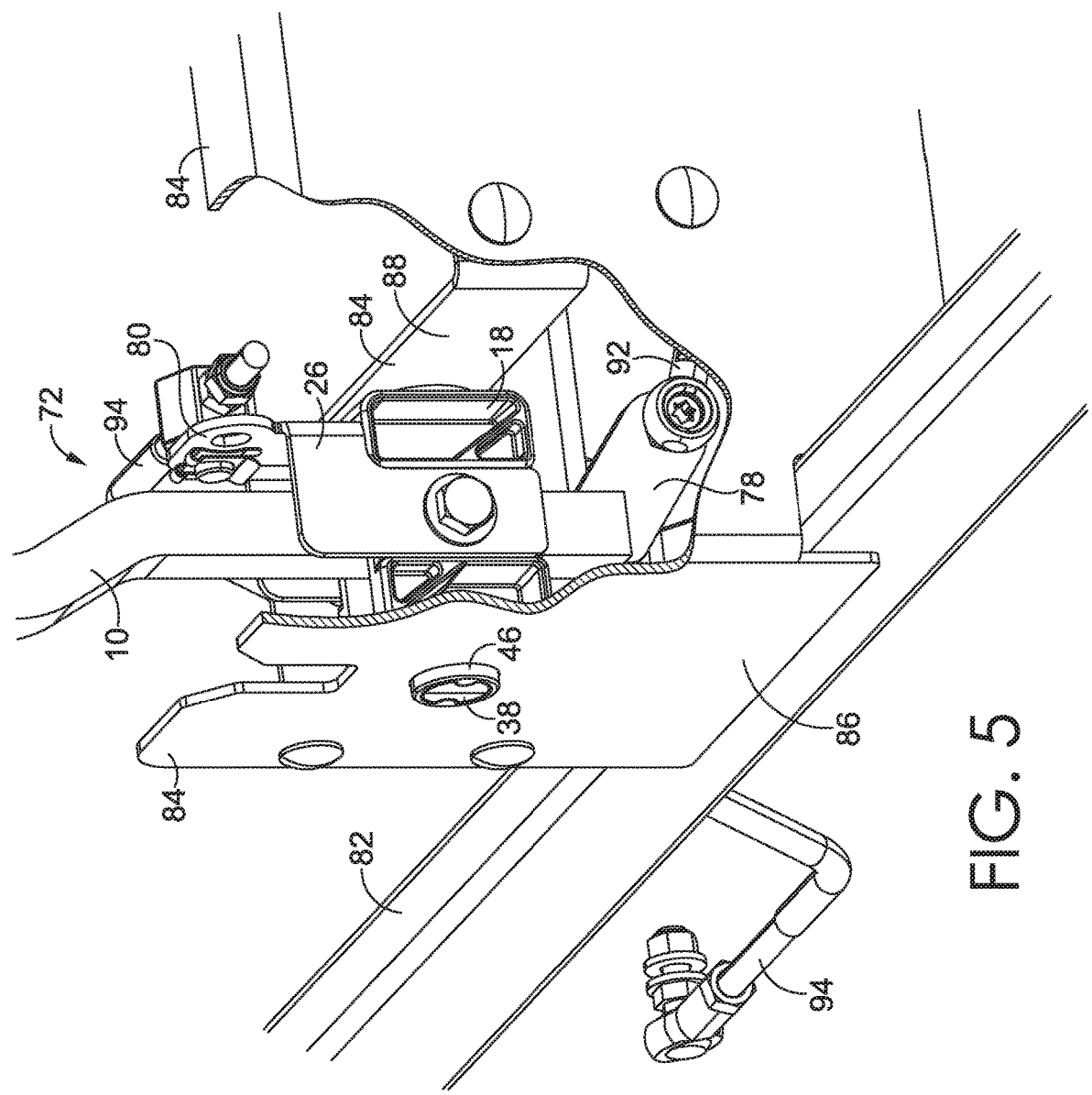
FIG. 5 depicts a detail view of a two-axis pivot assembly pivotally coupled to a terrain working vehicle, in accordance with aspects hereor.

Turning now to FIG. 5, a detail view depicts the coupling between the pivot assembly 72 and the mower 1. In particular, the mower 1 includes a frame that comprises a frame rail 82 and a plurality of frame members 84. The frame rail 82 comprises tubular steel in the illustrated aspect, but may comprise any other suitable material in other aspects. The frame members 84 comprise at least a first panel 86 and a second panel 88. The frame members may be coupled to the frame rail 82 and/or one another in any conventional manner. For example, the first panel 86 is welded to the frame rail 82 while the second panel 88 is bolted to the first panel 86. Thus, in some aspects, the second panel 88 may comprise a mounting plate. The first panel 86 and the second panel 88 each include an aperture configured to receive the bushings 44, 46 and bosses 34, 38 of the polymer housing 18. In other aspects, such as where the bosses 34, 38 are not axially or linearly aligned, one of the first panel 86 and the second panel 88 may include a slot through which one of the bosses and/or one of the bushings travels when the steering lever 10 is rotated about the second axis 42. In still other aspects, the first panel 86 and the second panel 88 may be parallel. In yet other aspects, the pivot assembly 72 may couple directly to the frame rail 82 or other types of frame members other than a panel.

In the illustrated aspect, the first panel 86 comprises a "U" shaped panel that extends longitudinally along a first side of the mower 1, laterally across the mower 1 to a second side of the mower 1, and longitudinally along the second side of the mower 1. The second panel 88 is depicted as an "L" shaped panel that in part extends in a longitudinal direction of the mower 1 and in part extends in a lateral direction of the mower 1. As illustrated, the first panel 86 and the second panel 88 are joined to form a steering box. The pivot assembly 72 is pivotally coupled within the steering box to the longitudinal portion of the first panel 86 and the longitudinal portion of the second panel 88.

Figure 7:
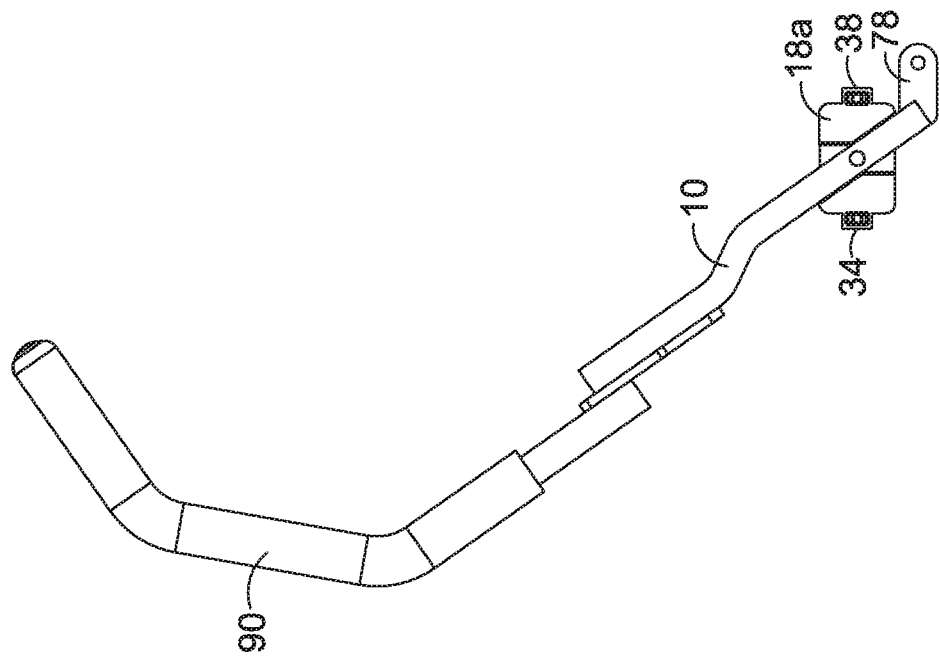
FIG. 7 depicts a front view of the steering lever of FIG. 6 in a second position relative to a polymer housing, in accordance with aspects hereof.
Figure 6:
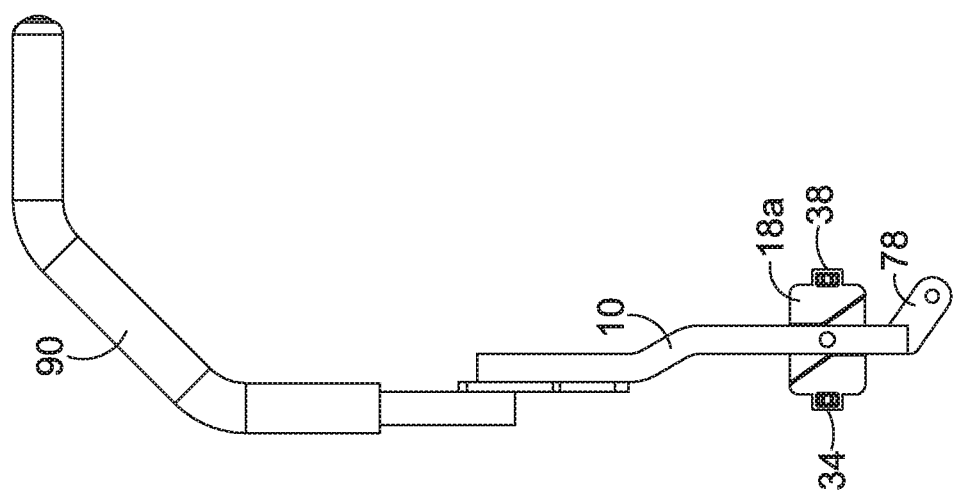
FIG. 6 depicts a front view of a steering lever in a first position relative to a polymer housing, in accordance with aspects hereof.

FIGS. 6 and 7 illustrate the steering lever 10 rotating about the first axis 30 (shown in FIG. 4A). As described above, the steering lever is pivotally coupled to the polymer housing 18. For ease of discussion, however, only the first housing portion 18a is shown. A handle 90 is coupled to the steering lever 10. In other aspects, the handle 90 may be integral to the steering lever 10.

FIG. 6 illustrates the steering lever 10 in a first position. While in the first position, the steering lever 10 is in a vertical position and contacts the vertical portions 68 of the slot 54 in the polymer housing 18. In other aspects, the first position may have a different, non-vertical position. For example, a fender on the mower 1 may include a "T" slot (as shown in FIG. 1) that may limit the travel of the steering lever 10. While in the first position, the connecting flange 78 is moved laterally away from the center of the mower 1.

FIG. 7 illustrates the steering lever 10 in a second position. While in the second position, the steering lever 10 is in an angular position and contacts the angular portions 70 of the slot 54 in the polymer housing 18. In some aspects, the second position may have a different orientation. For example, the "T" slot in the fender on the mower 1 may limit the travel of the steering lever 10. In another aspect, a portion of the mower frame, rather than the fender or the angular portions 70, limits the rotation of the steering lever 10. While in the second position, the connecting flange 78 is moved laterally toward the center of the mower 1.

When the steering lever 10 is in the first position, the parking brake system is disengaged. Likewise, when the steering lever 10 is in the second position, the parking brake system is engaged. In other aspects, however, the first position may be associated with the parking brake system being engaged and the second position may be associated with the parking brake system being disengaged.

Figure 8:
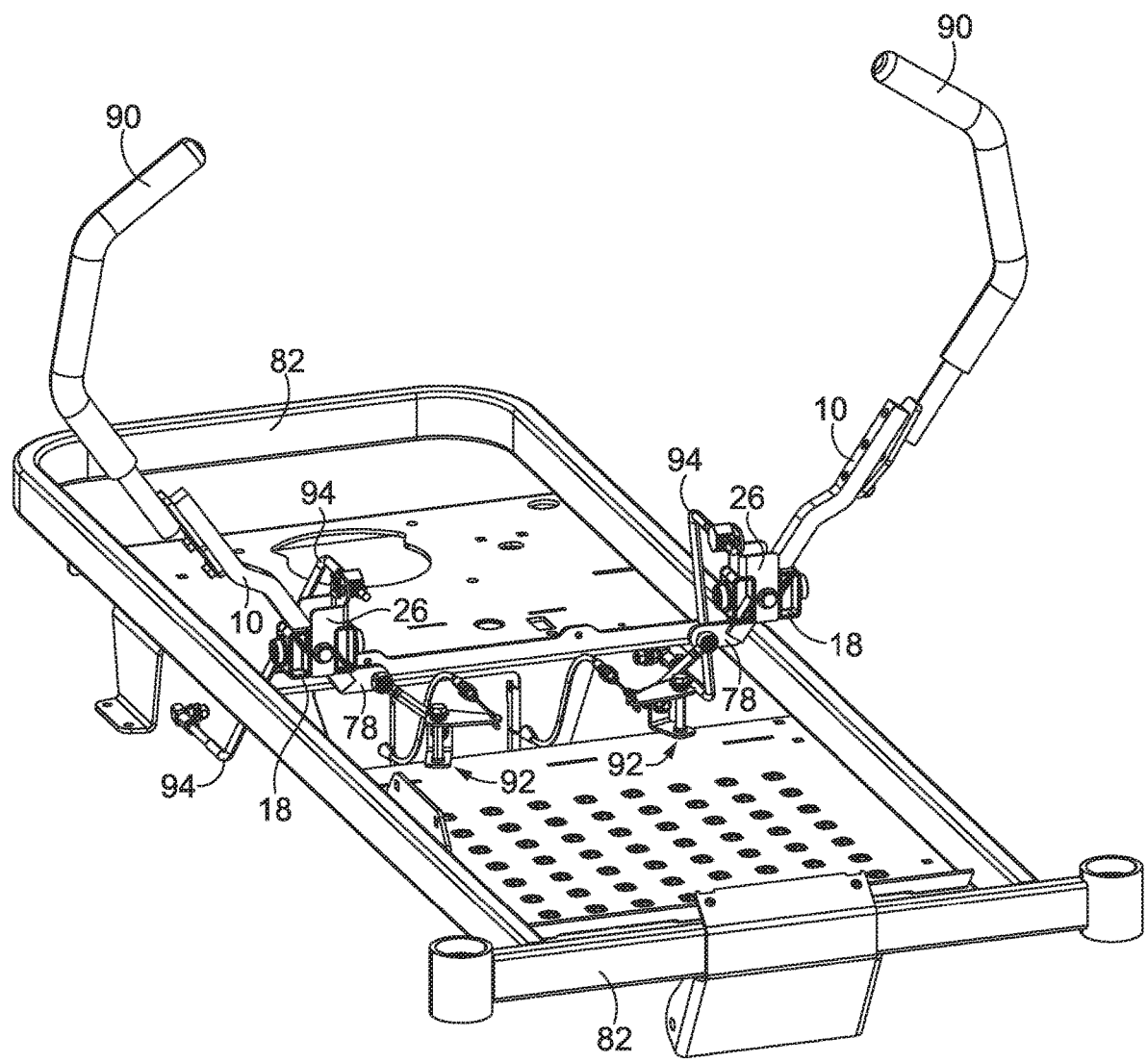
FIG. 8 depicts a perspective view of a terrain working vehicle frame where steering levers coupled thereto are in a first position, in accordance with aspects hereof.
Figure 9:
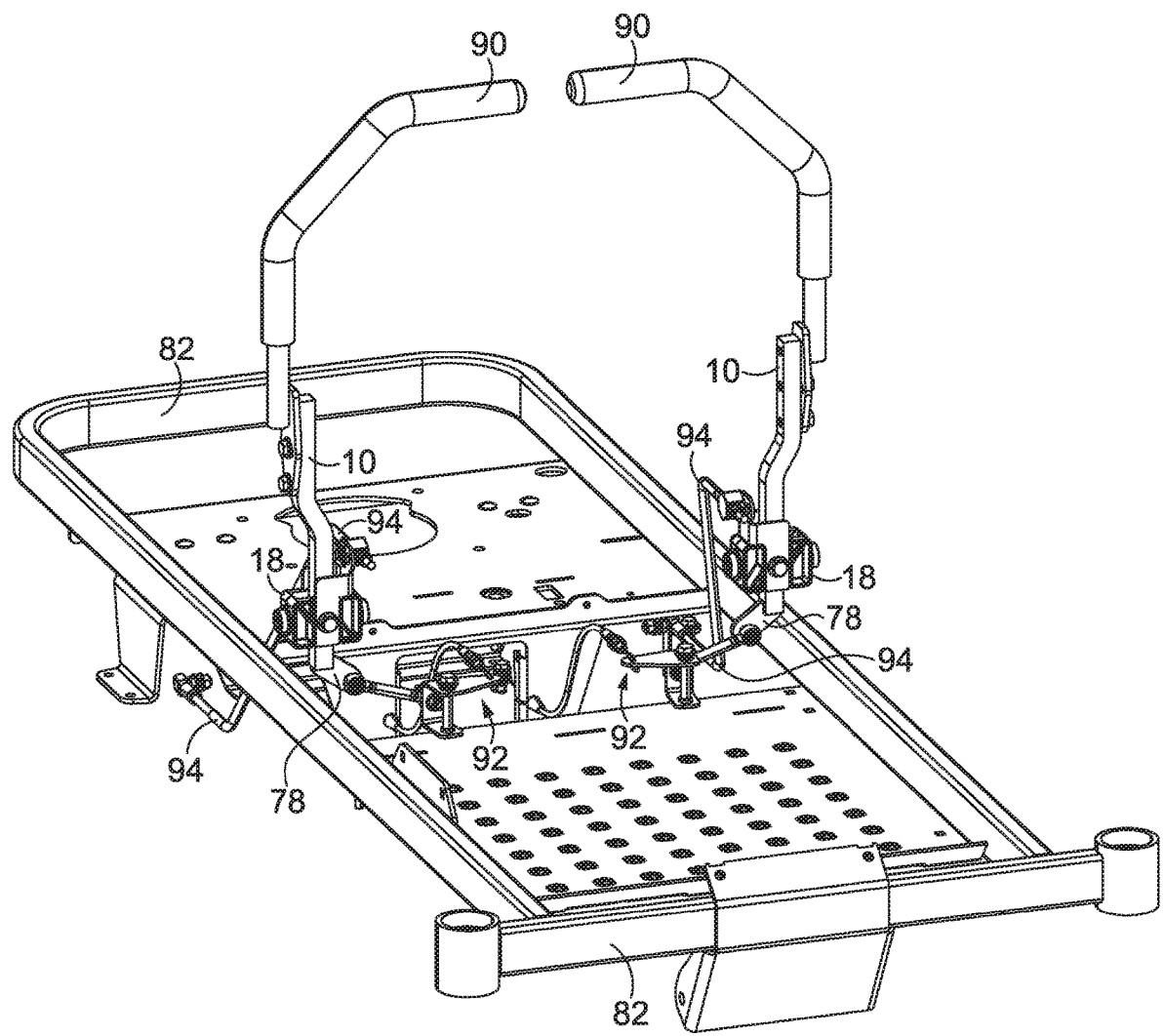
FIG. 9 depicts a perspective view of the terrain working vehicle frame and steering levers of FIG. 8 where the steering levers are in a second position, in accordance with aspects hereof.

Turning now to FIGS. 8-11, perspective views of the pivot assembly 72 coupled to the mower 1 illustrate the rotation of the steering lever 10 about the first axis 30 and the second axis 42. To enhance visibility of hidden parts, portions of the mower 1 are not shown (e.g., the first panel 86, among other portions). FIG. 8 shows the steering lever 10 in the second position, as discussed above, and FIG. 9 shows the steering lever 10 in the first position. As the steering lever 10 rotates about the first axis 30 to move between the first and second positions, lateral movement of the connecting flange 78 actuates a linkage 92 coupled to the parking brake system to engage/disengage said system. The linkage 92 may include one or more metallic links, rods, push-pull cables, bell cranks, or other mechanical couplings. In other aspects, non-mechanical couplings may connect the pivot assembly 72 to the parking brake system (e.g., control-by-wire, etc.).

Figure 10:
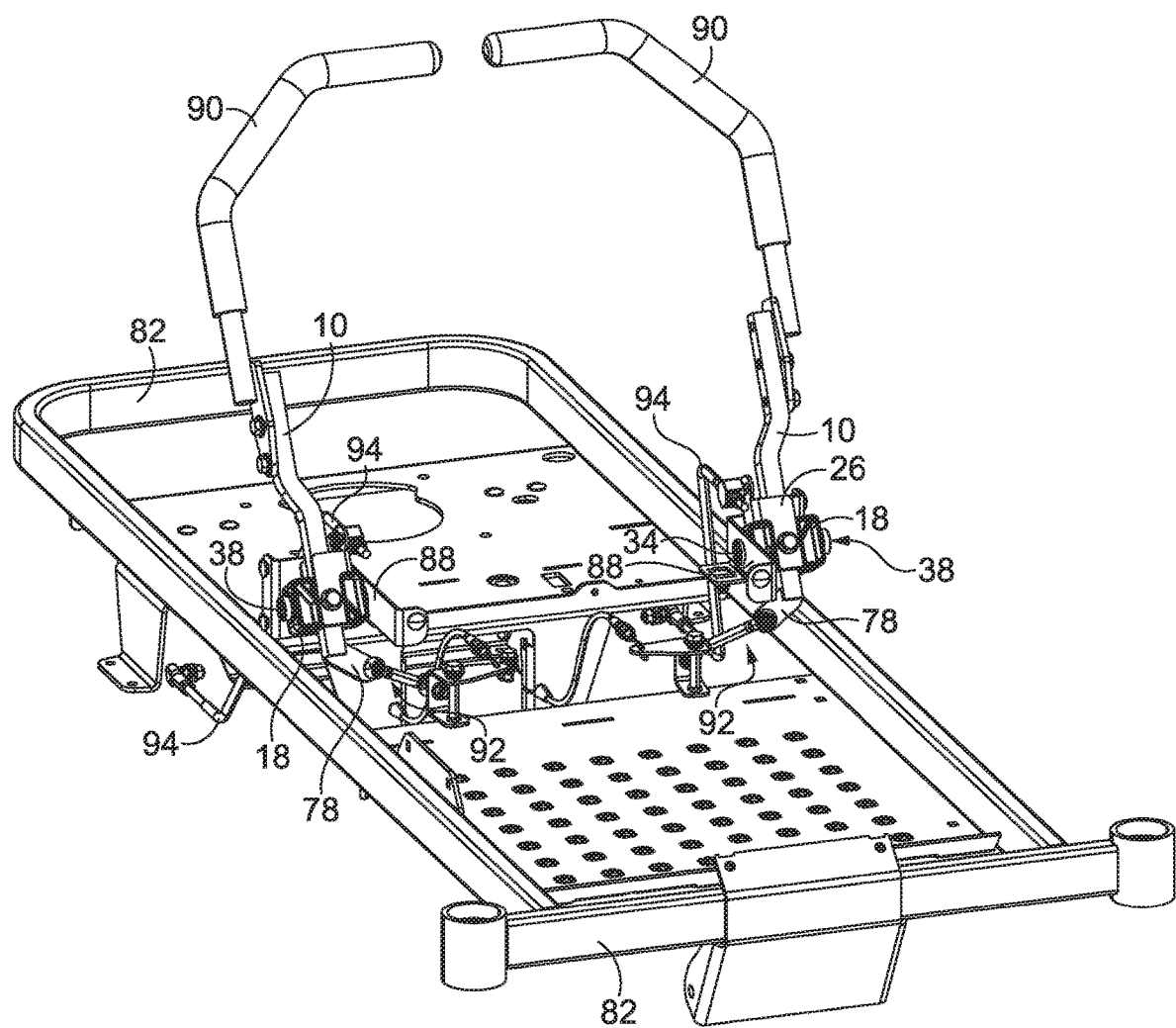
FIG. 10 depicts a perspective view of the terrain working vehicle frame and steering levers of FIG. 7 where the steering levers are in a rearward position, in accordance with aspects hereof.
Figure 11:
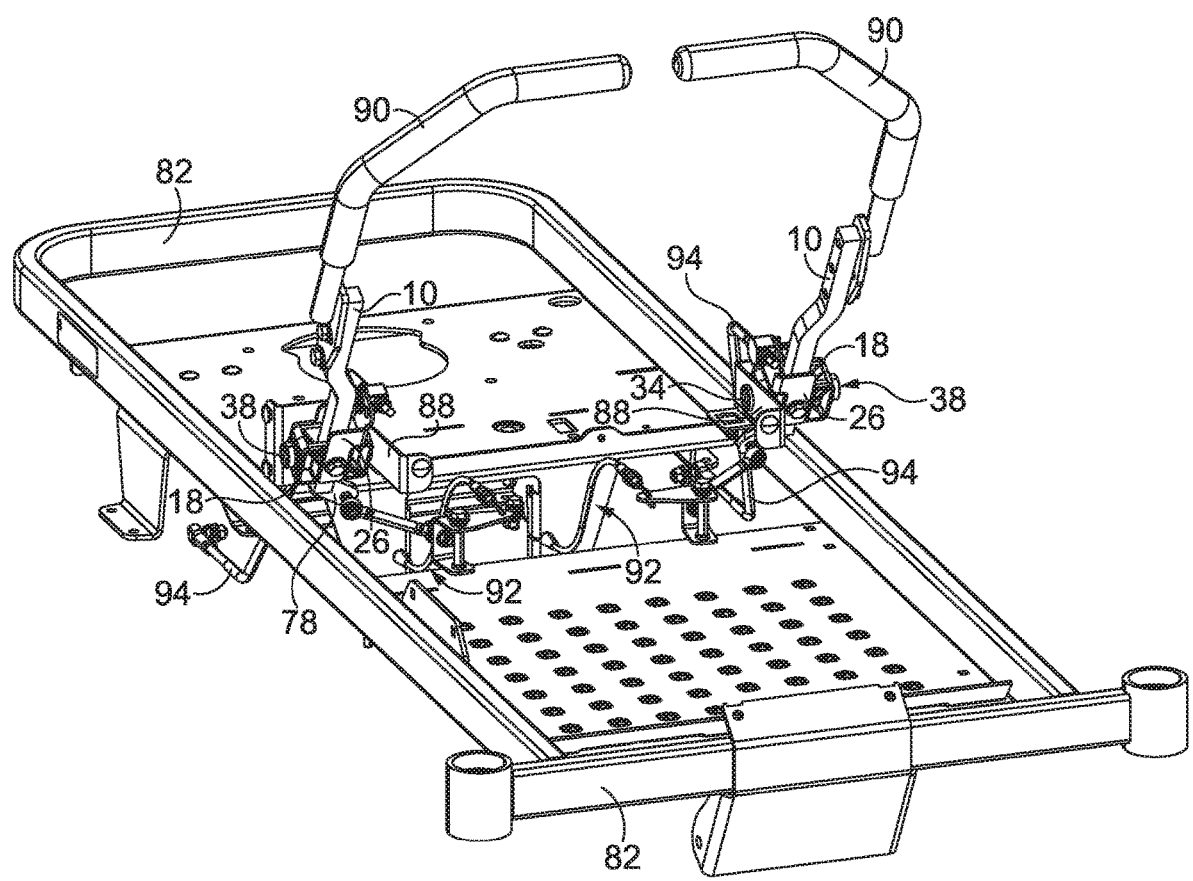
FIG. 11 depicts a perspective view of the terrain working vehicle frame and steering levers of FIG. 7 where the steering levers are in a forward position, in accordance with aspects hereof.

FIG. 10 shows the steering lever 10 rotated about the second axis 42 to a full rearward position. In the full rearward position, a linkage 94 coupled to the clasp 26 and the propulsion system is moved rearward to cause rearward propulsion of the mower 1. FIG. 11 shows the steering lever 10 rotated about the second axis 42 to a full forward position. In the full forward position, the linkage 94 is moved forward to cause forward propulsion of the mower 1. The second position is between the full forward position and the full rearward position. The second position may be associated with the propulsion system being in a neutral configuration, in accordance with some aspects. In other aspects, the first axis 30 and/or the second axis 42 may be oriented such that the direction of rotation is longitudinally (e.g., forward/rearward), laterally (e.g., side-to-side), vertically (e.g., up and down), or any combination thereof.

Figure 12:
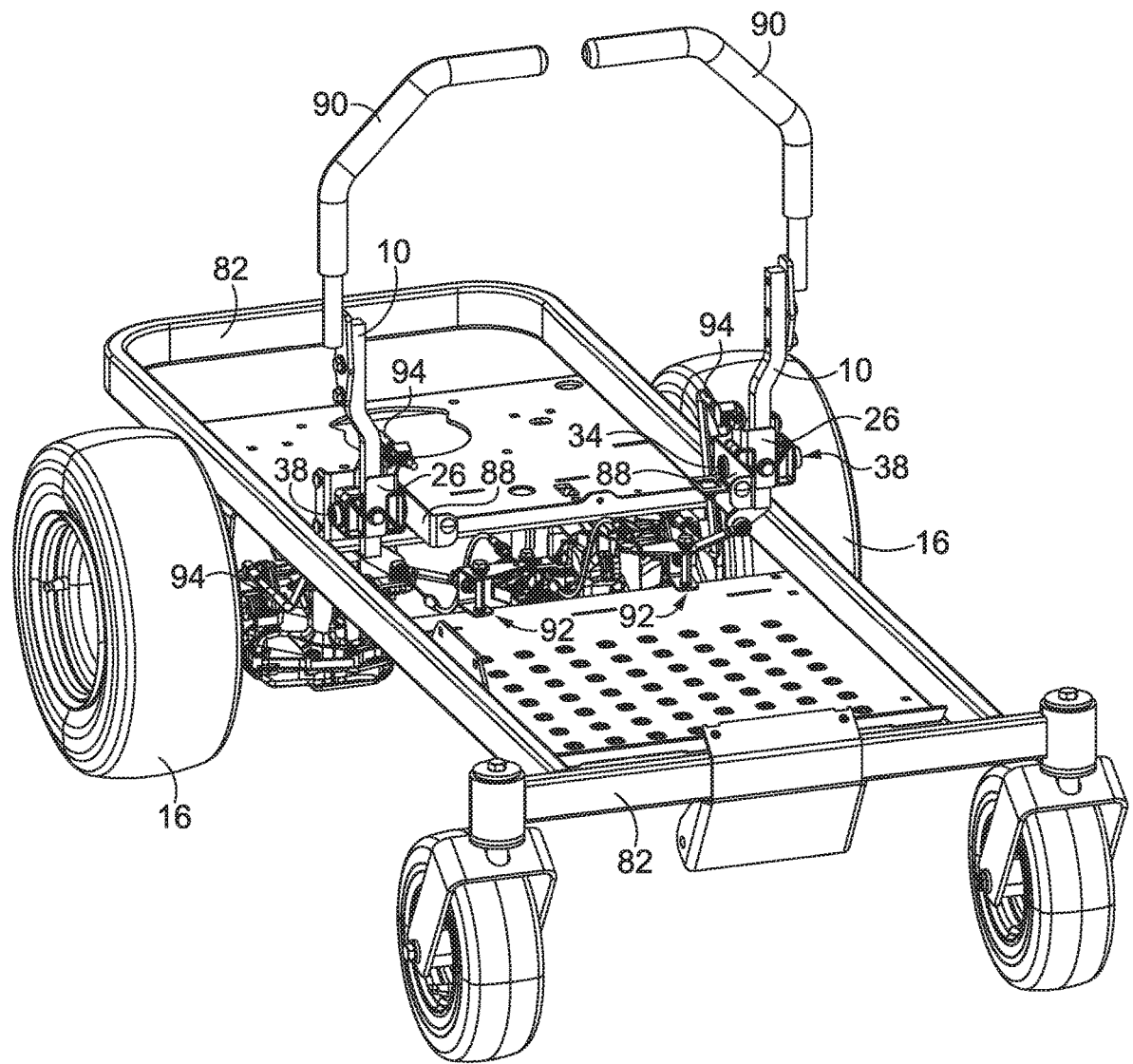
FIG. 12 depicts a perspective view of a terrain working vehicle's frame, steering levers, and propulsion system, in accordance with aspects hereof.
Figure 13:
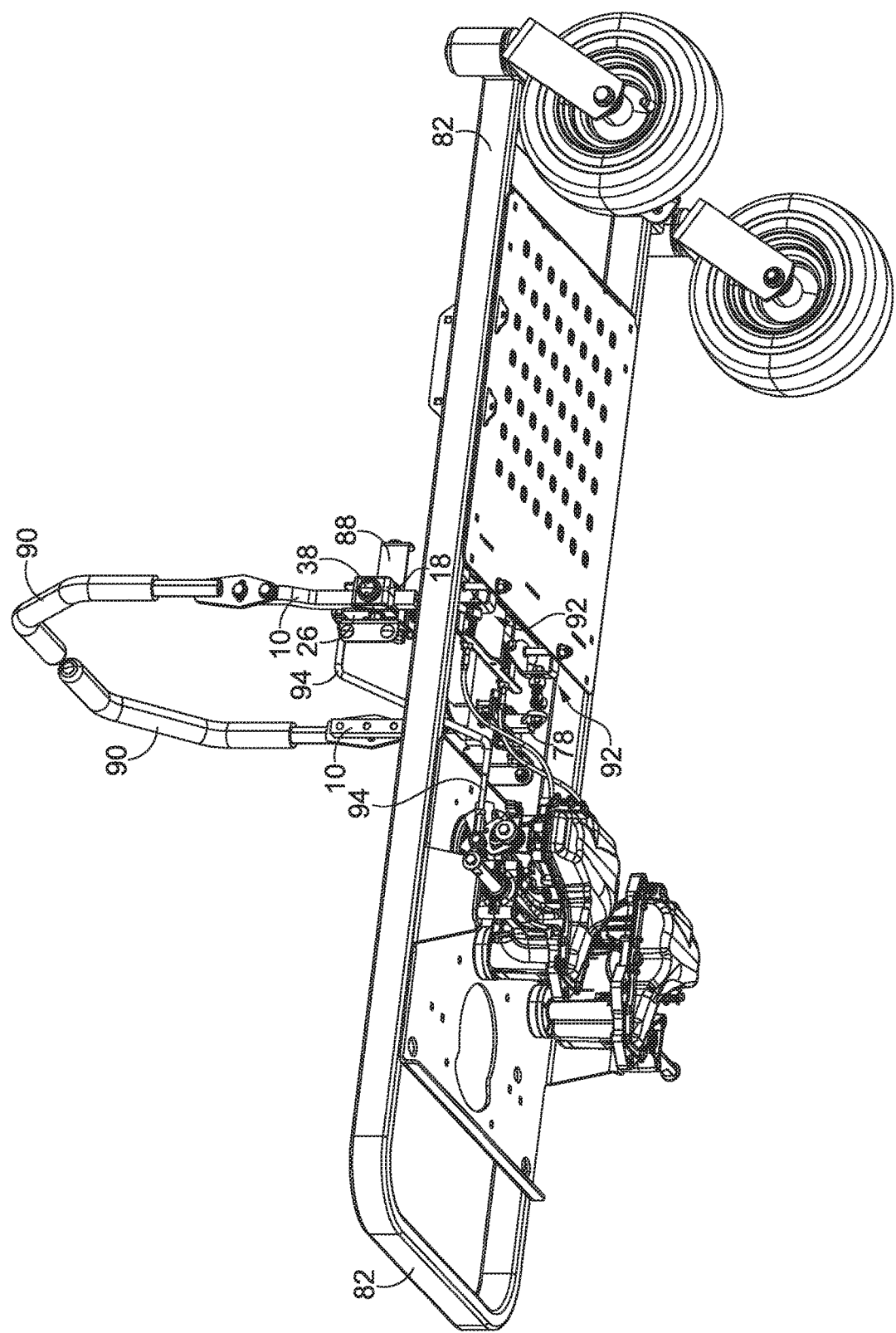
FIG. 13 depicts a perspective view of the terrain working vehicle of FIG. 11, in accordance with aspects hereof.

FIGS. 12 and 13 are perspective views of the mower 1 and illustrate the connection between the pivot assembly 72 and the propulsion system by the linkage 94.

Some aspects of this disclosure have been described with respect to the illustrative examples provided by FIGS. 1-13. Additional aspects of the disclosure will now be described that may be related to subject matter included in one or more claims of this application, or one or more related applications, but the claims are not limited to only the subject matter described in the below portions of this description. These additional aspects may include features illustrated by FIGS. 1-13, features not illustrated by FIGS. 1-13, and any combination thereof. When describing these additional aspects, reference may or may not be made to elements depicted by FIGS. 1-13.

One aspect disclosed herein is directed to a steering lever pivot component for a terrain working vehicle, may comprise a housing having a boss projecting in a first direction from two opposing sides, a slot formed through the housing in a second direction, and an aperture extending through the housing in a third direction. The housing may have a first boss projecting from a left side of the housing and a second boss projecting from a right side of the housing. The slot may be configured to receive a steering lever therein. The aperture may intersect the slot and may be configured to receive a fastener for pivotally connecting the steering lever to the housing. The slot may be shaped to permit the steering lever to rotate about a first axis associated with the aperture. The first boss and the second boss may be configured to permit the housing to rotate about a second axis associated with the first direction. The housing may be comprised of a polymer.

In some aspects, the housing may be divided between a first housing portion and a second housing portion. Each of the first housing portion and the second housing portion may include at least a portion of the first boss, at least a portion of the second boss, at least a portion of the slot, and at least a portion of the aperture. The first housing portion may be coupled to the second housing portion with a first bushing removably coupled to the first boss and a second bushing removably coupled to the second boss. The first bushing and the second bushing may each be comprised of a second polymer.

In other aspects, the slot may form a first opening on a top side of the housing and a second opening on a bottom side of the housing. The widths in the first direction of each of the first opening and the second opening may be wider than a width of a middle portion of the slot. The first direction, the second direction, and the third direction may be orthogonal to one another. The first direction and the second direction may define a first plane of rotation. The slot may be defined by at least four interior walls and comprise a first interior wall, a second interior wall, a third interior wall, and a fourth interior wall. The first interior wall may extend parallel with the first plane of rotation. The second interior wall may be spaced apart from the first interior wall. The second interior wall may extend parallel with the first plane of rotation. The third interior wall may extend between the first interior wall and the second interior wall. The fourth interior wall may be spaced apart from the third interior wall. The fourth interior wall may extend between the first interior wall and the second interior wall. Each of the third interior wall and the fourth interior wall may include a portion extending parallel to the second direction and an angular portion extending at an angle relative to the first and second directions.

Another aspect disclosed herein is directed to a pivot assembly for a steering lever driven terrain vehicle. The pivot assembly may comprise a steering lever pivotally coupled to a polymer housing through a slot formed through the polymer housing. The slot may be shaped to permit the steering lever to pivot between a first position and a second position about a first axis of rotation. The polymer housing may have a first boss projecting from a first side of the polymer housing and a second boss projecting from an opposite second side of the housing. A first polymer bushing may be coupled to the first boss and a second polymer bushing may be coupled to the second boss. The first and second polymer bushing may be configured to permit the steering lever and the housing to rotate in conjunction about a second axis of rotation when the housing is pivotally coupled to a frame of a terrain working vehicle.

In some aspects, the pivot assembly may further comprise a clasp coupled to the polymer housing. The clasp may be configured to couple to a drive system of the terrain working vehicle for controlling the propulsion system by rotating the steering lever about the second axis of rotation. The pivot assembly may further comprise a handle coupled to the steering lever. The steering lever may be pivotally coupled to the polymer housing such that a lower portion of the steering lever extends out of the slot from a bottom of the polymer housing. The lower portion may be configured to couple to a brake system of the terrain working vehicle for controlling the brake system by rotating the steering lever about the first axis of rotation.

In further aspects, the steering lever may rotate up to 45 degrees when moving between the first position and the second position. The polymer housing may comprise a first housing portion and a second housing portion. The first axis of rotation may be perpendicular to the second axis of rotation.

Another aspect disclosed herein is directed to a lever-controlled mower comprising a mower frame, a hydrostatic motor coupled to the frame, and a steering lever coupled to the hydrostatic motor. The steering lever may be pivotally coupled to a polymer housing and extend through a slot formed through the housing. The slot may be shaped to permit the steering lever to pivot between a first position and a second position about a first axis of rotation. The polymer housing may be pivotally coupled to the mower such that the steering lever and the polymer housing in conjunction may rotate about a second axis of rotation between a full forward position and a full rearward position.

In some aspects, the steering lever and the polymer housing can only rotate about the second axis of rotation after the steering lever has been moved to the second position. The lever-controlled mower may further comprise a parking brake system. The steering lever may mechanically actuate the parking brake system between an engaged position and a disengaged position. The parking brake system may be in the engaged position when the steering lever is in the first position. The parking brake system may be in the disengaged position when the steering lever is in the second position.

In further aspects, the lever-controlled mower may further comprise a first boss projecting from a first side of the polymer housing and a first bushing coupled to the first boss. The polymer housing may be coupled to the mower frame at the first bushing. The lever-controlled mower may further comprise a mounting plate coupled to the mower frame, a second boss projecting from a second side of the polymer housing, and a second bushing coupled to the second boss. A portion of the mounting plate may be parallel to the mower frame. The polymer housing may be coupled to the parallel portion of the mounting plate at the second bushing. The mower frame may have a notch. The steering lever may be received within the notch when the steering lever is in the first position. The notch may prevent movement of the received steering lever about the second axis of rotation.

Additionally, although some exemplary implementations of the embodiments described herein are shown in the accompanying figures, these implementations are not intended to be limiting. Rather, it should be understood that the various embodiments and aspects described herein may be used to control any apparatus, machine, or device. For example, the control devices described herein may be used to control computing devices, watercraft, aircraft, manufacturing machinery, and any number of other suitable devices, machines, or apparatuses.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A steering lever pivot component for a terrain working vehicle, the pivot component comprising:
    a housing having a first housing piece, a second housing piece, a first boss projecting from a left side of the housing, and a second boss projecting from a right side of the housing, wherein the first boss projection is in a first direction;
    the first housing piece having a first channel formed on a first inner face, the second housing piece having a second channel formed on a second inner face, the first channel and the second channel defining a slot formed through the housing, a first opening to the slot on a top of the housing, and a second opening to the slot on a bottom of the housing;
    the slot extending in a second direction, the slot configured to receive a steering lever therein such that the steering lever extends into the first opening and out from the second opening; and
    an aperture extending through the housing in a third direction, the aperture intersecting the slot, the aperture configured to receive a fastener for pivotally connecting the steering lever to the housing,
    wherein the slot is shaped to permit the steering lever to rotate about a first axis associated with the aperture, wherein the first boss and the second boss are configured to permit the housing to rotate about a second axis associated with the first direction,
    wherein the housing is comprised of a polymer.

2. The pivot component of claim 1, wherein each of the first housing piece and the second housing piece include at least a portion of the first boss, at least a portion of the second boss, at least a portion of the slot, and at least a portion of the aperture.

3. The pivot component of claim 1, wherein the first housing piece is coupled to the second housing piece with a first bushing removably coupled to the first boss and a second bushing removably coupled to the second boss, wherein the first bushing and the second bushing are each comprised of a second polymer.

4. The pivot component of claim 1, wherein widths in the first direction of each of the first opening and the second opening are wider than a width of a middle portion of the slot.

5. The pivot component of claim 4, wherein the first direction, the second direction and the third direction are orthogonal to one another, wherein the first direction and the second direction define a first plane of rotation, and wherein the slot is defined by at least four interior walls, the at least four interior walls comprising:
    a first interior wall extending parallel with the first plane of rotation;
    a second interior wall spaced apart from the first interior wall and extending parallel with the first plane of rotation;
    a third interior wall extending between the first interior wall and the second interior wall; and
    a fourth interior wall spaced apart from the third interior wall and extending between the first interior wall and the second interior wall,
    wherein each of the third interior wall and the fourth interior wall include a portion extending parallel to the second direction and an angular portion extending at an angle relative to the first and second directions.

6. A pivot assembly for a steering lever driven terrain working vehicle, the pivot assembly comprising:
    a polymer housing having a first housing piece and a second housing piece, the polymer housing having a first boss projecting from a first side of the polymer housing and a second boss projecting from an opposite side of the polymer housing, wherein a first part of the first boss and a first part of the second boss extend from the first housing piece and a second part of the first boss and a second part of the second boss extend from the second housing piece;
    the first housing piece having a first channel formed on a first inner face, the second housing piece having a second channel formed on a second inner face, the first channel and the second channel defining a slot formed through the housing, a first opening to the slot on a top of the housing, and a second opening to the slot on a bottom of the housing when the first housing piece is coupled to the second housing piece;
    a steering lever pivotally coupled to the polymer housing, the steering lever extending into the first opening, through the slot, and out from the second opening, the slot shaped to permit the steering lever to pivot between a first position and a second position about a first axis of rotation and relative to the polymer housing;

a first polymer bushing coupled to the first boss and a second polymer bushing coupled to the second boss, the first and second polymer bushings configured to retain the first housing piece proximate the second housing piece and permit the steering lever and the polymer housing to rotate in conjunction about a second axis of rotation when the pivot assembly is pivotally coupled to a frame of a terrain working vehicle.

7. The pivot assembly of claim 6 further comprising a clasp coupled to the polymer housing, the clasp configured to couple to a drive system of the terrain working vehicle for controlling the propulsion system by rotating the steering lever about the second axis of rotation.

8. The pivot assembly of claim 6 further comprising a handle coupled to the steering lever.

9. The pivot assembly of claim 6, wherein a lower portion of the steering lever configured to couple to a brake system of the terrain working vehicle for controlling the brake system by rotating the steering lever about the first axis of rotation.

10. The pivot assembly of claim 6, wherein the steering lever rotates up to 45 degrees when moving between the first position and the second position.

11. The pivot assembly of claim 6, wherein the first axis of rotation is perpendicular to the second axis of rotation.

12. A lever-controlled mower comprising:
 a mower frame;
 a hydrostatic motor coupled to the frame;
 a polymer housing having a first housing piece and a second housing piece, a first boss extending from a first side of the polymer housing and a second boss extending from a second side of the polymer housing, each of the first boss and the second boss located in part on the first housing piece and in part on the second housing piece;
 the first housing piece having a first channel formed on a first inner face, the second housing piece having a second channel formed on a second inner face, the first channel and the second channel defining a slot formed through the polymer housing, a first opening to the slot on a top of the polymer housing, and a second opening to the slot on a bottom of the polymer housing;
 a first polymer bushing coupled to the first boss and a second polymer bushing coupled to the second boss, the first polymer bushing and the second polymer bushing rotatably coupled to the mower frame;
 a steering lever coupled to the hydrostatic motor; and
 the steering lever pivotally coupled to a polymer housing and extending through the slot, the steering lever extending into the first opening and out from a second opening, the slot shaped to permit the steering lever to pivot between a first position and a second position about a first axis of rotation within the slot and relative to the polymer housing,
 wherein the steering lever and the polymer housing in conjunction may rotate about a second axis of rotation between a full forward position and a full rearward position.

13. The lever-controlled mower of claim 12, wherein the steering lever and the polymer housing can only rotate about the second axis of rotation after the steering lever has been moved to the second position.

14. The lever-controlled mower of claim 12 further comprising a parking brake system, wherein the steering lever mechanically actuates the parking brake system between an engaged position and a disengaged position.

15. The lever-controlled mower of claim 14, wherein the parking brake system is in the engaged position when the steering lever is in the first position, wherein the parking brake system is in the disengaged position when the steering lever is in the second position.

16. The lever-controlled mower of claim 14, wherein the mower frame has a notch, wherein the steering lever is received within the notch when the steering lever is in the first position, wherein the notch prevents movement of the received steering lever about the second axis of rotation.

* * * * *